Jan. 30, 1945.　　　C. P. BEDFORD　　　2,368,441
METHOD OF PREFABRICATING SHIPS
Filed March 21, 1942　　　5 Sheets-Sheet 1
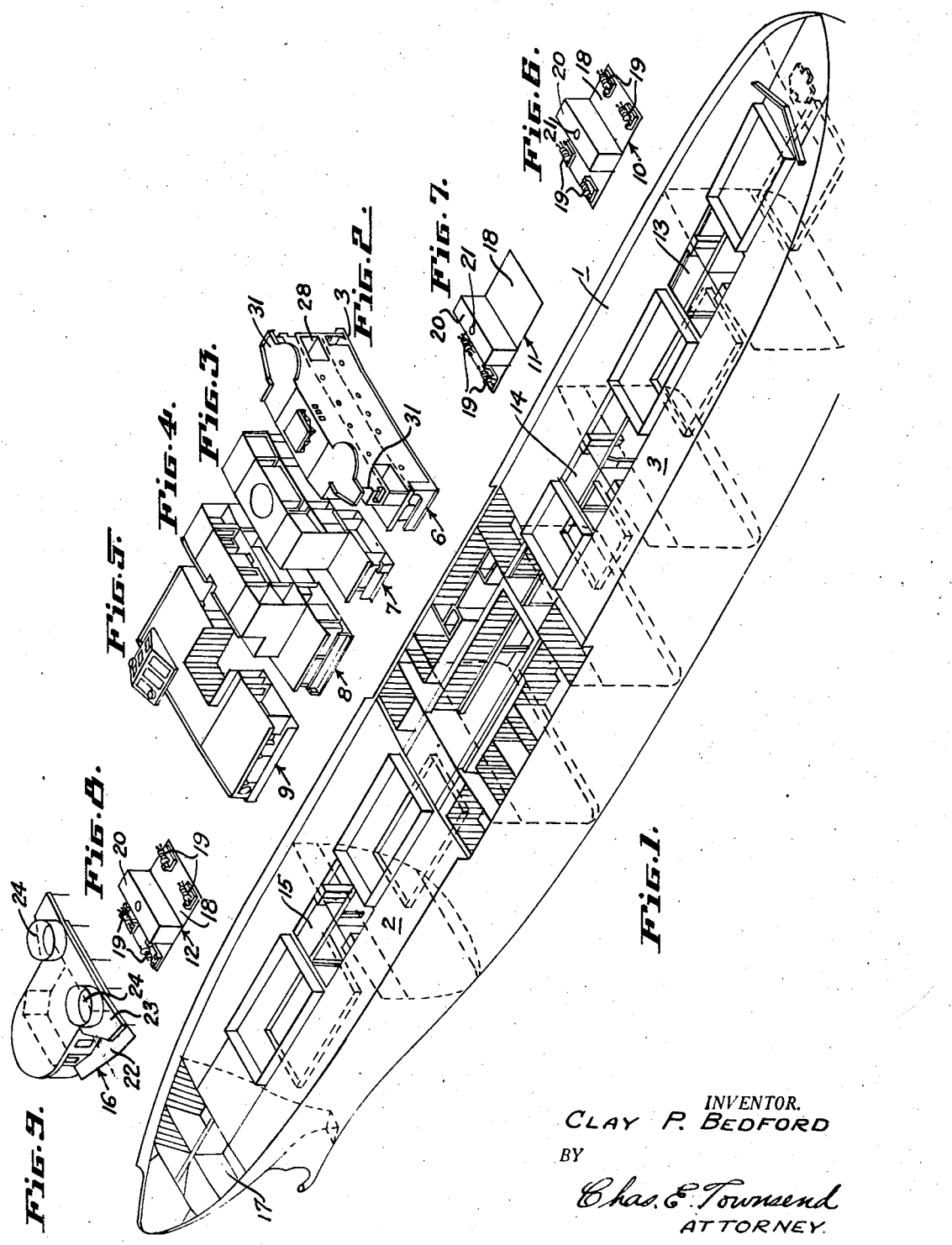
INVENTOR.
CLAY P. BEDFORD
BY
Chas. E. Townsend
ATTORNEY.

Jan. 30, 1945. C. P. BEDFORD 2,368,441
METHOD OF PREFABRICATING SHIPS
Filed March 21, 1942 5 Sheets-Sheet 2

INVENTOR.
CLAY P. BEDFORD
BY
Chas. E. Townsend
ATTORNEY.

Jan. 30, 1945. C. P. BEDFORD 2,368,441
METHOD OF PREFABRICATING SHIPS
Filed March 21, 1942   5 Sheets-Sheet 3
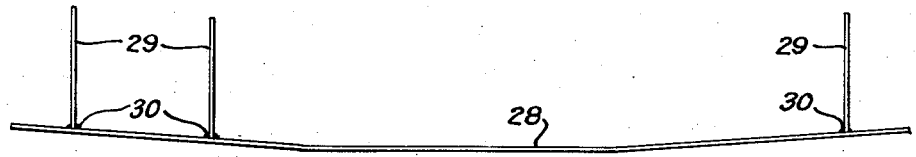
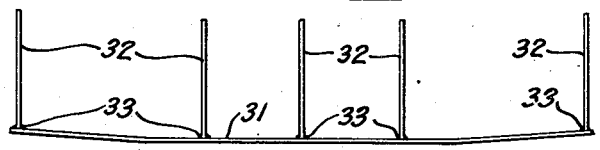
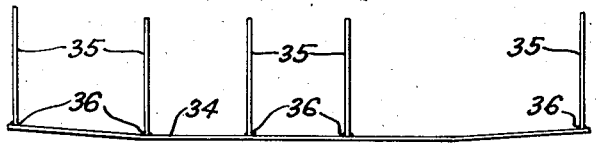
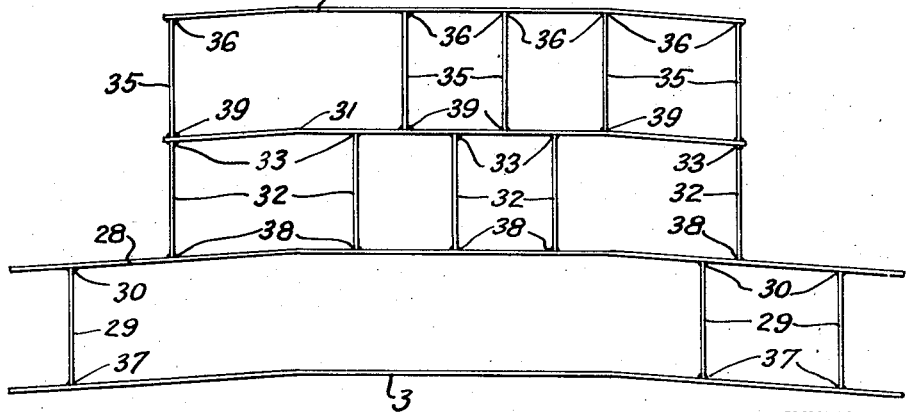
INVENTOR.
CLAY P. BEDFORD
BY
Chas. E. Townsend
ATTORNEY.

Jan. 30, 1945. C. P. BEDFORD 2,368,441
METHOD OF PREFABRICATING SHIPS
Filed March 21, 1942 5 Sheets-Sheet 4

INVENTOR.
CLAY P. BEDFORD
BY
Chas. E. Townsend
ATTORNEY.

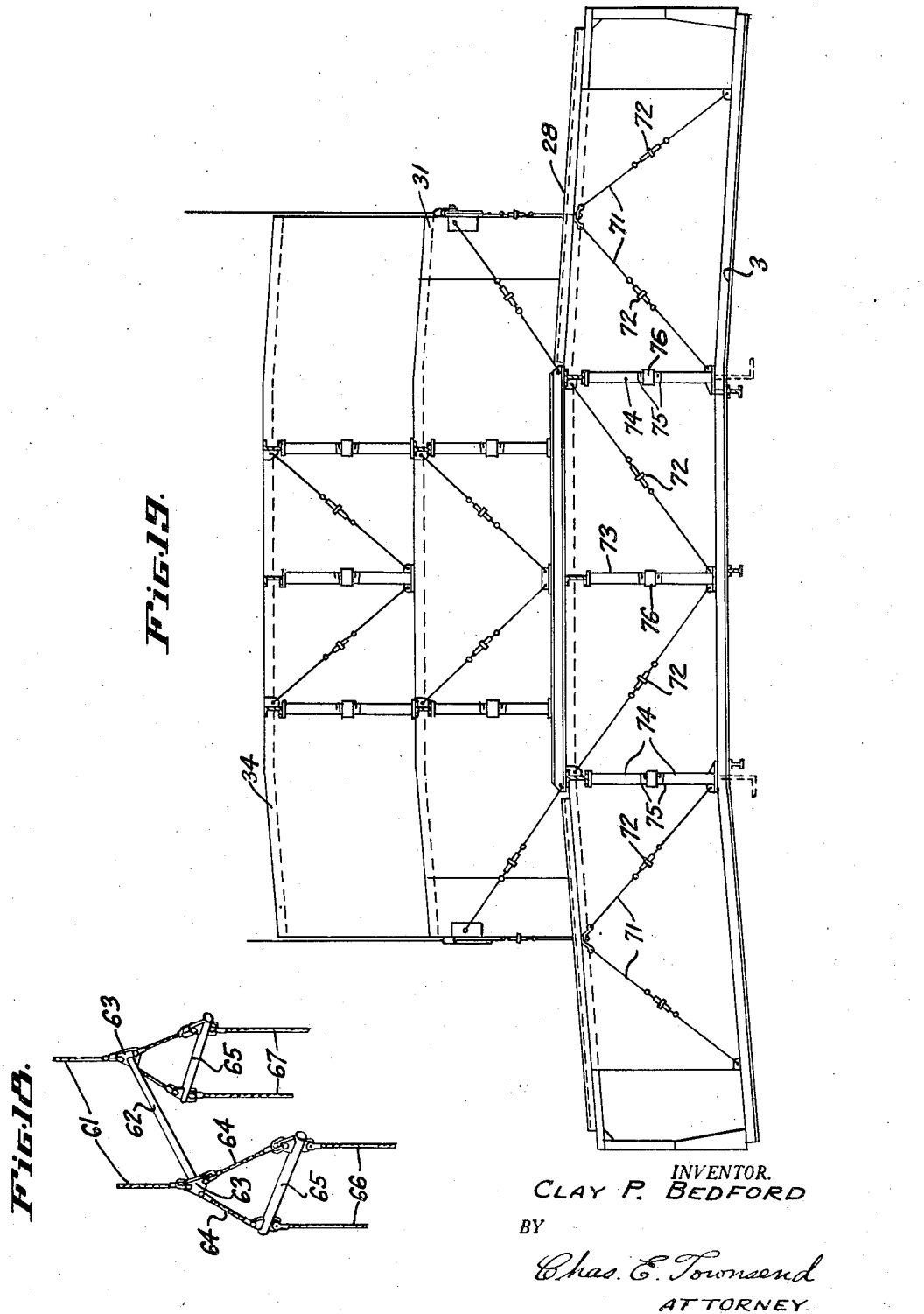

Patented Jan. 30, 1945

2,368,441

UNITED STATES PATENT OFFICE 2,368,441

METHOD OF PREFABRICATING SHIPS

Clay P. Bedford, Berkeley, Calif.

Application March 21, 1942, Serial No. 435,656

13 Claims. (Cl. 114—65)

This invention relates to shipbuilding and particularly pertains to a method and means of economizing and conserving time and labor in the fabrication of ships in mass production. While it is highly useful in the fabrication of cargo ships, tankers, and the like, it is also adapted for use in the fabrication of other types of ships.

It is the usual, and as far as known, universal practic in shipbuilding, first to erect the hull, together with appropriate braces, reinforcements and supports, and then after launching, to equip the vessel with its various structures of a midships deckhouse, after deckhouse and mast houses, thereby consuming many weeks and months of additional time in the finishing and equipment of the vessel. Under present demands for mass production of cargo type vessels, it is desirable to cut down as much as possible on the length of time between the laying down of the keel and the placing of the finished ship in commission.

Under the present practice, many steps of construction and assembly must be deferred until certain others have been completed, with the result that not only does the building of the ship require a certain period of time, but the ways on which the ship is built is occupied by the ship for a certain period of time during which it cannot be used for the construction of another ship. The period of time that is required to build a ship and the period of time that the ways is occupied by the ship during its construction can both be reduced by increasing the hours of labor until enough workmen in suitable shifts are continuously working to obtain maximum speed of production under present practice. Even though work be done continuously with the maximum number of workmen possible, there is a fixed maximum in the speed of production beyond which improvement is impossible. This maximum will vary for ships of different characteristics and will be determined by such characteristics. There is, accordingly, for any ship of predetermined characteristics, a minimum period of time required for its construction and a minimum period of time that the ways is occupied by it.

Many steel ships are now being built of steel plates, beams and perhaps other forms, in a manner involving the joining of the plates to each other, and perhaps other parts thereto, by welding. The welding of bulkheads to an overhead deck is more difficult than welding with the line of juncture below the eyes and hands of the workman.

Objects of this invention are to provide a method for the construction of ships which lessens the previously fixed minimum periods of time required for the construction of a ship and during which the ways is occupied by it, which avoids overhead welding and permits the welder to do practically all his welding below, and other objects will be apparent on reading this specification.

The present invention broadly stated, comprises the pre-assembly or pre-erection or pre-construction of rather large and heavy sections or parts of deck superstructure housings, supplying such sections, where needed, with suitable temporary struts, braces or other reinforcing or supporting means so that the large and heavy sections will be structurally sound and may be suspended and lifted by cranes into place on the ways or on the partially constructed ship without substantial deformation of the lifted sections and without the occurrence of undue stresses or strains therein, and then welding or otherwise fastening the pre-assembled sections together. Thus, instead of assembling all the individual elements of the housing serially, one after another, the present invention comprises the simultaneous pre-assembly of very large and heavy sections in suitable pre-assembly buildings or stations, transporting these sections to the ways, and then uniting the pre-assembled sections to the hull or deck and to one another.

Another feature of the invention is the arrangement of the dividing lines between adjacent sections to make permanent parts of the sections provide the necessary supports in order to minimize the necessity for temporary supports, and to minimize the joining or connection of pipes, conduits, decks and bulkheads, especially if insulated, and other parts. The arrangement of the dividing lines between sections is also such that all parts on which work is to be done will be easily accessible to the workman, such as the ship fitters, plumbers, pipe fitters, electricians, those working on specialty subcontracts, deck coverings and the like, the joiners or wood workers, the painters, the finishers, and the like, including those who construct or locate built-in furniture, and finally those who inspect and check the work done.

The present invention has been developed to that end by a method which permits at the same time that the keel is laid down, work may be started on the accessory superstructures and proceed simultaneously with the building of the hull so that upon the completion of the latter, these accessories may be ready to be installed in fixed position on the ship; resulting not only in a tremendous saving of time but the cutting down of many hours of labor.

One of the serious problems, however, in such an undertaking, is the fact that these superstructures being of steel and usually consisting of a plurality of decks, are not only cumbersome but may weigh upwards of 75 tons. The present invention involves a plan by which a structure, such as a deckhouse, can properly and advantageously be built as self-containing sections, wherein each section may be treated and handled as a separate unit through the various stages of erection of the unit section and on through to its final equipment and finish, including all of the above-mentioned operations. These various steps are performed progressively in various stages in the plant. After completion and after the vessel is ready to receive these superstructures, the sections are moved finally into position on the ship; the sections then being united and assembled into the completed deckhouses so that they become permanently united into an integral part of the ship. After final installation they are as indistinguishable as to permanence, strength, rigidity and sea worthiness as though the structure had been built piece by piece in situ into the ship in the customary manner.

Having described the invention in general terms, it will now be described more in detail, and, as a specific example, as applied to the mass production of the United States Maritime Commission EC 2-S-C1 type cargo vessels. Referring to the drawings which form a part of this specification:

Figs. 1-9 represent an exploded perspective view of a ship without the masts;

Fig. 1 is a perspective view of the hull;

Fig. 2 is a perspective view of the forward section of the deckhouse;

Fig. 3 is a similar view of the next section thereof;

Fig. 4 is a similar view of the next section thereof;

Fig. 5 is a similar view of the after section thereof;

Figs. 6, 7 and 8 are similar views of the masthouses and appurtenant winches;

Fig. 9 is a similar view of the after deckhouse.

Figs. 11, 12 and 13 are more or less schematic type views illustrating the construction of the deckhouse sections;

Fig. 14 is a similar view showing decks of the deckhouse sections in assembled relation;

Fig. 18 is a perspective view showing part of the means for lifting a completed deckhouse section; and Fig. 19 is a more or less schematic athwartships sectional view showing strengthening means to maintain the parts of a deckhouse section in normal relation while being lifted.

Figure 10:
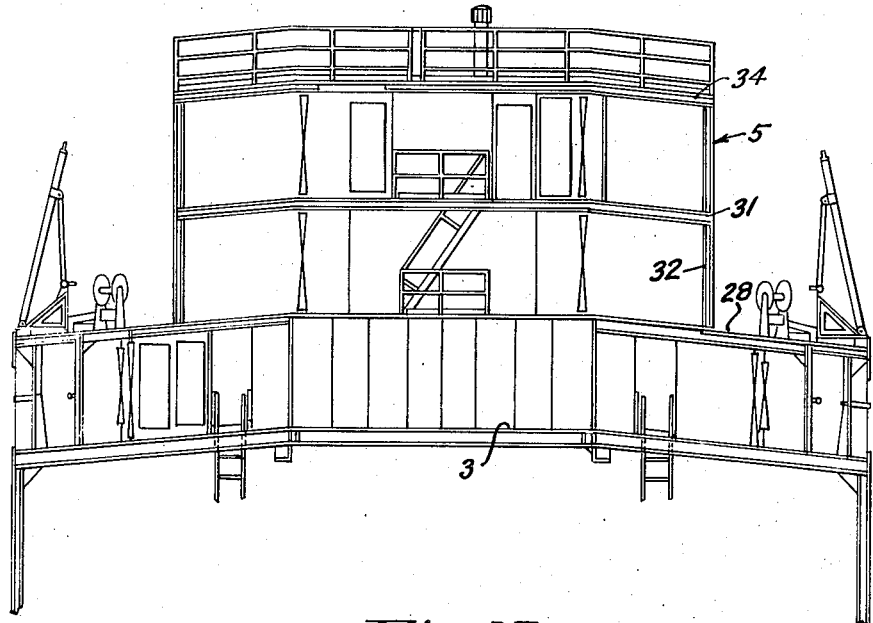
Fig. 10 is a more or less schematic type sectional view of the completed deckhouse with appurtenant parts, looking aft.

The completed hull is shown as 1, and within it is the so-called second deck 2. The upper deck 3 is above the second deck and forms the ceiling for the rooms, compartments, and passageways for which the second deck constitutes the floor. The deckhouse 5 (Fig. 10) is on the upper deck and is formed of the sections 6, 7, 8 and 9 (Figs. 2-5). The mast houses 10, 11 and 12 (Figs. 6, 7 and 8) are also on the upper deck; and they are over and cover the deck openings 13, 14 and 15. The after deckhouse 16 is on the same level and over the deck opening 17. The hull, decks, deckhouses and mast houses are formed of steel plates welded together. The mast house assemblies comprise each a steel plate deck section 18 on which are fixed the winches 19 and a housing member 20, each of which has an opening 21 at the top therethrough to accommodate the respective mast. The after deckhouse comprises a deck section 22 above which is an elevated deck 23 provided with suitable protection walls 24 for machine guns and gunners. The mast houses and after deckhouse are assembled complete and then placed in the proper positions on the upper deck to which the respective deck sections 18 and 22 are welded.

The mast house and after deckhouse are each of such size and weight that they can be lifted by means of cranes and placed in proper position on the ship. In at least one shipyard where the United States Maritime Commission EC2-S-C1 cargo vessels are being built, cranes are available which have a capacity of about 75 tons and which are capable of lifting and suspending the mast houses and the after deckhouse in complete units. The complete midships deckhouse, however, is of a weight which far exceeds the capacity of such cranes, the weight being such that it becomes necessary to divide it into at least four sections so that it can be lifted and moved by such cranes. While cranes could no doubt be built capable of handling the completed midships deckhouse as a unit, yet it is often desirable to built a unit in separate sections in order to afford easy access to materials needed for and to men working on the installation of fittings and furnishings, since the division into sections opens up passageways through which the men and materials must pass, which may otherwise be too narrow or constricted for free movement therethrough. For mass production, the deckhouse sections 6, 7, 8 and 9 are built as completely as is possible, and pre-assembled with bolt connections for aligning. A list of the weights of the various housings follows:

| Item | Pounds |
| --- | --- |
| Forward mast house | 70,000 |
| Midship mast house | 41,000 |
| After mast house | 55,000 |
| Midships deckhouse | 466,076 |
| After deckhouse | 90,237 |

The midships deckhouse is thus much heavier than is capable of being handled by most shipyard cranes and it is therefore pre-built as separate sections 6, 7, 8 and 9.

The manufacturing procedure, after the steel plates are received and unloaded, is to place them in plate storage racks for use as needed, or to use them immediately, as the case may be. The plates are laid out on a platform, suitable templates placed thereon, and marks made on the plates according to the templates. The plates are then burned or cut along the marked lines and subjected to whatever manufacturing steps may be required, such as rolling, punching, shearing, bending, and the like. Further procedure will be understood by referring to Figs. 11 to 14 in conjunction with Figs. 2 to 5.

The next procedure is the assembly of the plates into various complete mast houses, after deckhouse, and sections of the midships deckhouse. The boat deck 28 is next above the upper deck 3. Bulkheads 29 run from the upper deck to the underside of the boat deck above, and they are welded to the boat deck 28 by placing the boat deck upside-down with the bulkheads 29 supported to project upwardly therefrom (Fig. 11), welds being applied at 30. The bridge deck 31 is next above the boat deck and constitutes the ceiling for any rooms, compartments or passageways between the two. Bulkheads 32 between the two are attached by turning the bridge deck upside-down, and supporting the bulkheads 32 to project upwardly therefrom, whereupon they are welded at 33 (Fig. 12). The house top 34 is next above the bridge deck and forms the ceiling for any rooms, compartments or passageways therebetween. The bulkheads 35 forming the compartments between the house top and the bridge deck are similarly attached to the house top while it is upside down (Fig. 13), and welded thereto at 36. A great advantage results from assembling the bulkheads with the decks in upside-down position, because this permits of a downhand rather than an overhead welding operation.

The assembly illustrated on Fig. 11 is then placed rightside up on the upper deck 3 and welded thereto at 37, this welding operation being likewise a downhand, rather than an overhead operation. The assembly illustrated on Fig. 12 is then placed right side up on the boat deck 28 and welded thereto at 38; and the assembly illustrated on Fig. 13 is placed right side up on the bridge deck 39 and welded thereto at 39. The upside-down assembly, by welding of the bulkheads to the deck and thereafter attaching them by welding to the deck below in right side up position, eliminates the otherwise necessary overhead welding which requires more skill and time than ordinary or downhand welding.

After the steel parts have been welded as just described into the deckhouse sections, such sections are furnished and finished to the fullest extent possible. The ship fitters, plumbers, pipe fitters, electricians, those working on specialty subcontracts, those working on deck coverings, the joiners or wood workers, those working on installation of insulation, those installing built-in or attached furniture, the painters, the finishers, and those doing any other jobs in the deckhouse, and finally the inspectors and checkers, complete their work and pass upon the work done in each individual section. It might be stated here that pipes are in suitable positions so that connections can be easily made when the deckhouse sections are joined together, and the same is true of electrical conduits. It is preferred at the present time not to place the electrical wiring complete in each deckhouse section before such sections are assembled into a complete deckhouse, but to have sufficient wire coiled in an end section (6 or 9), and then after the deckhouse sections have been united into a complete deckhouse, unroll the wire and place it in the conduits provided therefor. However, if preferred, the wiring can be completed in each section, the different sections of wire being suitably joined and the joints insulated, as is well known in the art.

It may often be desirable to join the various sections of a unit together by means of bolts, clips or other joining devices, in order to insure positive fit and alignment of the various sections and their fittings and furnishings, and also their positive realignment and fit when later erected on the hull. The resulting unit may then be moved, as for example on a roller runway, adjacent to the hull, if not already there; whereupon the sections may be unjoined from each other and separately lifted onto the hull. Under certain conditions of operation, it may even be desirable to temporarily join the sections together before starting, or after starting but before completing, the installation of the fittings and furnishings.

As prefabrication is completed the separate sections are unbolted and transferred in successive order to the hull, where they are again erected in sequence and rebolted prior to final welding at the points of cleavage. As many as desired of each complete deckhouse section can be built to provide what is the equivalent of mass line production.

The various completed items, whether complete mast houses or after deckhouse, or sections of the midships deckhouse are lifted to a point over the ship and lowered into the predetermined place on the upper deck. With this in view, cables 61 (Fig. 18) are suspended from a crane (not shown) in a manner to be simultaneously raised and lowered thereby. A bar 62 is provided with plates 63 to which the cables 61 are suitably attached. Attached to the plates 63 also are cables 64, to which in turn bars 65 are attached. Suspended from the bars 65 or from the ends of the cables 64 are pairs of cables 66, 67 which are suitably attached to the piece to be moved in any suitable manner (not shown). The cables 66 are held suitably spaced from each other by a bar 65, and the same is true of the cables 67; while the two pairs of cables 66 and 67 are held suitably spaced from each other by the bar 62 which also holds the cables 61 suitably spaced from each other.

Depending on the weight and other characteristics of the particular piece to be moved, it may undergo distortion, stresses or strains while suspended by the crane, and too great a weight might result in permanent deformation or in a piece becoming less sound structurally than may be desired; unless suitable precautions be taken. Struts, braces or other type of supporting or strengthening means may be used where needed to minimize the undesirable effects of suspending the piece, such for example as flexible cables 71 (Fig. 19) provided with turnbuckles 72 for the purpose of shortening them to provide sufficient tension to prevent various structural members from receding from each other, and braces 73 comprising rigid members having oppositely running threads 75 and collars 76 having threads interiorly thereof which register with the threads 75. The members 73 can be lengthened to provide sufficient compression to prevent various members from approaching each other, by turning the collars 76 in the proper direction.

Certain parts of the structure itself which is to be suspended will provide the necessary strength adjacent thereto and avoid the necessity for additional strengthening or supporting means thereat. For example, bulkheads between and attached to next adjacent decks will function more or less as supporting or strengthening means for such decks, particularly adjacent bulkheads. There may, however, be lengths of decks attached to bulkheads only at one end of such lengths, as will be referred to hereafter. In such instances additional means such as those indicated at 71 and 74 may be required temporarily during suspension, and what and where they should be is merely a matter of good engineering and mathematical calculation.

Figure 15:
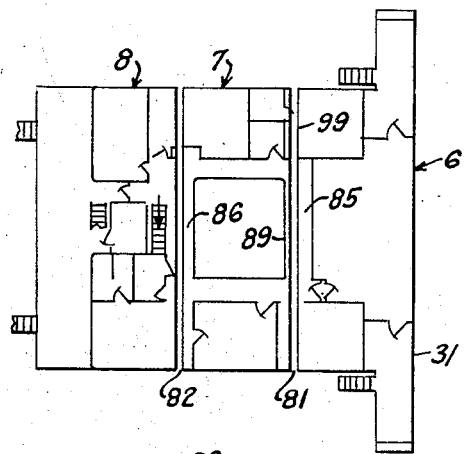
Fig. 15 is a plan view showing the arrangement of rooms, passageways and other spaces on the bridge deck level of the midships deckhouse, the deckhouse being in sections.
Figure 16:
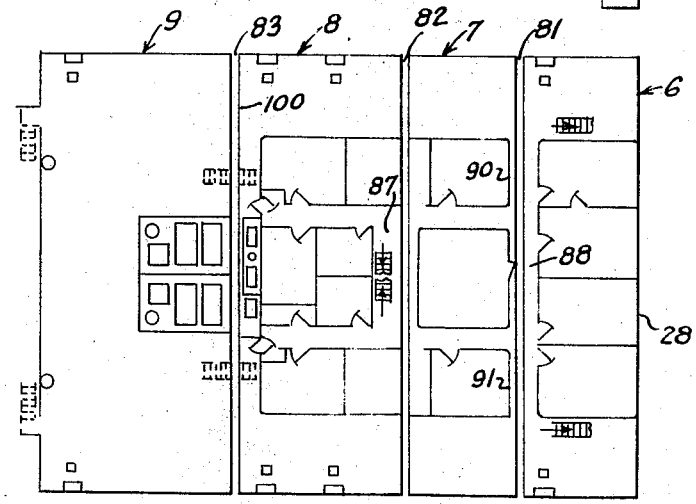
Fig. 16 is a similar view presenting similar features of the deck next below, that is, at the boat deck level, the deckhouse being in sections.
Figure 17:
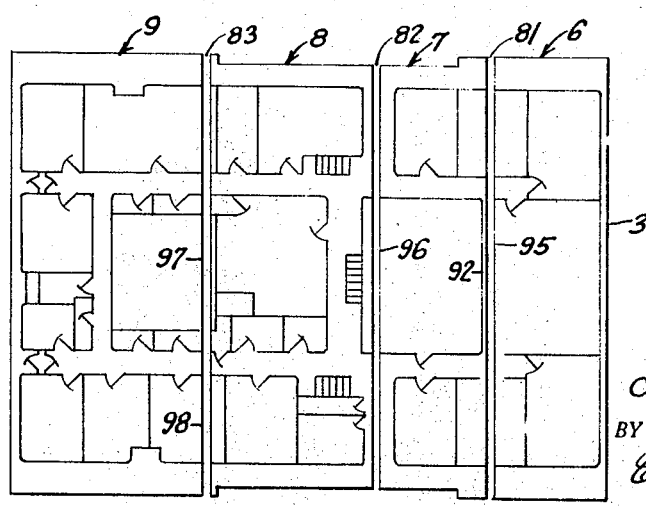
Fig. 17 is a similar view presenting similar features of the deck next below, that is, at the upper deck level, the deckhouse being in sections.

The plans of the various decks of the midships deckhouse appear on Figs. 15, 16 and 17, these figures showing the house with the sections 6, 7, 8 and 9 separated from each other. The lines of separation between adjacent sections are preferably straight at each deck, and preferably with the separation lines at the superimposed decks lying in a vertical plane. In other words, the lines of separation between the sections 6 and 7 are straight lines at each deck and superimposed over each other. The same is true of the sections 7 and 8, and of the sections 8 and 9. It thus appears as though the individual sections have been sliced off the complete deckhouse. This may not be essential, but it simplifies not only the production of the sections 6, 7, 8 and 9, but also their assembly into a unitary deckhouse.

The bridge deck 31 is over the boat deck 28 and forms the ceiling for the rooms and passageways therebetween. The boat deck is over the upper deck 3 and forms the ceiling for the rooms and passageways therebetween. The house top 34, not shown on Figs. 15, 16 and 17 but appearing on Figs. 10, 13, 14 and 19, is over the bridge deck 31 and forms the ceiling for the rooms and passageways therebetween. The deck plans for these three decks may be any desired. The division or separation lines 81 between the sections 6 and 7 are preferably in an upright plane at all points touched thereby. The same is true of the division or separation line 82 between the sections 7 and 8, and also of the division or separation line 83 between the sections 8 and 9. The locations of the division or separation lines will be determined primarily by the weights of the resulting sections, each of which as already explained, must be below a certain maximum determined by the capacity of the lifting crane available.

These lines will also be located as far as possible in such a manner that the workmen will have access to and can work upon each part of each section on which work of any kind is to be done while it is still a separate section; so that, as far as is convenient, the least number of temporary strengthening means during the suspension of the separate sections by the crane will be needed; and to require cutting or interference of the minimum amount of deck covering, pipe lines, electric conduits, and the like. It has been found advisable to locate the division or separation lines where possible through passageways, such for example as 85, 86, 87, 88 and so closely adjacent to any available bulkheads, such as 89, 90, 91, 92, and the like, that such bulkheads will maintain the structural strength of the section while the section is suspended without the least addition of temporary strengthening elements thereat. The additional strengthening means are to be used wherever the separation or division lines between the sections would cause sufficient weakening to result in permanent distortion or deformation or even in undesired stresses and strains, for example at such locations as 95, 96, 97, 98, 99, 100, and the like.

The structure of the complete midships deckhouse may be considered as cellular with the cells arranged more or less irregularly at the same and at different levels. While this seems to complicate the determination of the most desirable locations of the division or separation lines between the individual sections, the rules given above simplify the apparent complexity.

An inherent characteristic of the invention lies in the method of fabricating the cellular units, whether these units are a deckhouse or a boiler room or analogous parts of a ship, where two spaced deck or floor members and connecting bulkheads are to be assembled.

After adjacent sections have been placed in proper position, they are welded to the ship or to the upper deck, and to each other. As the welding proceeds, the additional temporary strengthening means may be removed. The final product has the same structure and the same strength as if the whole were fabricated merely by adding one steel plate at a time.

The invention has been described with respect to the construction of welded steel ships and it is there that it has its greatest value. Certain features of the invention are, however, useful also in the construction of ships where rivets, bolts or other fastening means than welds are used to hold the steel plates together on only certain parts or all over the ship.

Claims to the features, wherein the deckhouse structures are constructed in the upside-down position and subsequently reversed and mounted on the hull, are presented in my divisional application, Serial No. 540,462, filed June 15, 1944.

Certain details have been referred to for the purpose of describing the invention, but some of them may be varied without departing from the spirit of the invention, the scope of which is defined in the appended claims.

What I claim is:

1. The method of shipbuilding which includes the steps of erecting a hull on the ways, simultaneously fabricating the various superstructures of deckhouses, in the fabrication of which deckhouses the structure is built in individual sections of which a plurality are adapted to constitute a complete deckhouse unit, each section comprising upper and lower deck portions and connecting bulkheads, and then assembling said sections on shipboard and uniting them to the ship and to each other in permanent position.

2. The method of shipbuilding which includes the steps of erecting a hull on the ways, simultaneously fabricating at a location apart from the ways the various superstructures of deckhouses, in the fabrication of which deckhouses the structure is build in individual sections of which a plurality are adapted to constitute a complete deckhouse unit, each section comprising upper and lower deck portions and connecting bulkheads, moving said sections to the location of the ways, and then assembling said sections on shipboard and uniting them to the ship and to each other in permanent position.

3. The method of shipbuilding which includes the steps of erecting a hull on the ways, simultaneously fabricating at a location apart from the ways the various superstructures of deckhouses, in the fabrication of which deckhouses the structure is built in individual sections of which a plurality are adapted to constitute a complete deckhouse unit, each section comprising upper and lower deck portions and connecting bulkheads, assembling the several sections in their ultimate relation, securing said sections in that relation, dividing said assembly into a plurality of sections, and finally assembling said plurality of sections on shipboard and uniting them to the ship and to each other in permanent position as a unitary structure.

4. The method of shipbuilding which includes the steps of erecting a hull on the ways, simultaneously fabricating the various superstructures of deckhouses, in the fabrication of which deckhouses the structure is built in individual sections of which a plurality are adapted to constitute a complete deckhouse unit, each section comprising upper and lower deck portions and connecting bulkheads and each section including structure having several deck levels in height, and then assembling said sections on shipboard and uniting them to the ship and to each other in permanent position.

5. The method of shipbuilding which includes the steps of erecting a hull on the ways, simultaneously fabricating at a location apart from the ways the various superstructures of deckhouses, in the fabrication of which deckhouses the structure is built in individual sections of which a plurality are adapted to constitute a complete deckhouse unit, each section comprising upper and lower deck portions and connecting bulkheads and each section including structure having several deck levels in height, and then assembling said sections on shipboard and uniting them to the ship and to each other in permanent position.

6. The method of shipbuilding which includes the steps of erecting a hull on the ways, simultaneously fabricating the various superstructures of deckhouses, in the fabrication of which deckhouses the structure is built in individual sections of which a plurality are adapted to constitute a complete deckhouse unit, each section comprising upper and lower deck portions and connecting bulkheads, outfitting each section with permanent equipment including pipes, conduits, and other fixtures adapted to be joined to similar equipment of adjacent sections in a completed unit, and then assembling said sections on shipboard and uniting them to the ship and to each other in permanent position and uniting the portions of said equipment of adjacent sections.

7. The method of shipbuilding which includes the steps of erecting a hull on the ways, simultaneously fabricating at a location apart from the ways the various superstructures of deckhouses, in the fabrication of which deckhouses the structure is built in individual sections of which a plurality are adapted to constitute a complete deckhouse unit, each section comprising upper and lower deck portions and connecting bulkheads, outfitting each section with permanent equipment including pipes, conduits, and other fixtures adapted to be joined to similar equipment of adjacent sections in a completed unit, moving said sections each with its respective equipment therein to the location of the ways, and then assembling said sections on shipboard and uniting them to the ship and to each other in permanent position and uniting the portions of said equipment of adjacent sections.

8. The method of shipbuilding which includes the steps of erecting a hull on the ways, simultaneously fabricating the various superstructures of deckhouses, in the fabrication of which deckhouses the structure is built in individual cellular sections of which a plurality are adapted to constitute a complete deckhouse unit, each section comprising upper and lower deck portions and connecting bulkheads, connecting the sections temporarily into their unitary final assembled relation for alignment, separating the sections of the unit along vertical lines of cleavage, and then assembling said sections on shipboard and uniting them to the ship and to each other in permanent position.

9. The method of shipbuilding which includes the steps of erecting a hull on the ways, simultaneously fabricating at a location apart from the ways the various superstructures of deckhouses, in the fabrication of which deckhouses the structure is built in individual cellular sections of which a plurality are adapted to constitute a complete deckhouse unit, each section comprising upper and lower deck portions and connecting bulkheads, connecting the sections temporarily into their unitary final assembled relation for alignment, separating the sections of the unit, the lines of separation between adjacent sections being in vertical planes, moving said sections to the location of the ways, and then assembling said sections on shipboard and uniting them to the ship and to each other in permanent position.

10. The method of shipbuilding which includes the steps of erecting a hull on the ways, simultaneously fabricating at a location apart from the ways the various superstructures of deckhouses, in the fabrication of which deckhouses the structure is built in individual cellular sections of which a plurality are adapted to constitute a complete deckhouse unit, each section comprising upper and lower deck portions and connecting bulkheads, connecting the sections temporarily into their unitary final assembled relation for alignment, separating the sections of the unit, the lines of separation between adjacent sections of upper and lower decks lying in a vertical plane, moving said sections to the location of the ways, and then asssembling said sections on shipboard and uniting them to the ship and to each other in permanent position.

11. In the method of building a steel ship, the steps which include the prefabrication of a deckhouse as a structural unit, having a plurality of levels in height, said deckhouse at each level comprising an upper and a lower deck portion and connecting bulkheads, assembling separately each lower deck portion with its bulkheads into a cellular structure, assembling together to constitute a whole deckhouse structure the several last named cellular deck-level structures, dividing said so assembled deckhouse in vertical planes of cleavage adjacent to the correspondingly located bulkheads, moving the resultant sections to position on the ship's hull, and permanently uniting the sections to each other and to the ship.

12. The method of shipbuilding which includes the steps of erecting a hull on the ways, simultaneously fabricating at a location apart from the ways, a deckhouse structure of full size for erection on said hull, separating said structure into a plurality of sections each having upper and lower deck portions and connecting bulkheads and each section having several deck levels in height, then assembling said sections on shipboard and uniting them to the ship and to each other in permanent position.

13. The method of shipbuilding which includes the steps of erecting a hull on the ways, simultaneously fabricating at a location apart from the ways, a deckhouse structure of full size for erection on said hull, separating said structure into a plurality of sections each having upper and lower deck portions and connecting bulkheads, and then assembling said sections on shipboard and uniting them to the ship and to each other in permanent position.

CLAY P. BEDFORD.